(12) United States Patent
Spence (10) Patent No.: US 10,433,525 B1
(45) Date of Patent: Oct. 8, 2019

(54) ILLUMINATED DOG BELT

(71) Applicant: David A. Spence, Miami, FL (US)

(72) Inventor: David A. Spence, Miami, FL (US)

( * ) Notice: Subject to any disclaimer, the term of this patent is extended or adjusted under 35 U.S.C. 154(b) by 127 days.

(21) Appl. No.: 15/462,527

(22) Filed: Mar. 17, 2017

(51) Int. Cl.
*A01K 27/00* (2006.01)
*F21V 33/00* (2006.01)
*F21V 23/04* (2006.01)
*F21L 4/02* (2006.01)
*F21V 23/00* (2015.01)
*F21Y 103/10* (2016.01)
*F21Y 115/10* (2016.01)

(52) U.S. Cl.
CPC .......... *A01K 27/006* (2013.01); *A01K 27/002* (2013.01); *A01K 27/005* (2013.01); *F21L 4/02* (2013.01); *F21V 23/003* (2013.01); *F21V 23/0414* (2013.01); *F21V 33/0008* (2013.01); *F21Y 2103/10* (2016.08); *F21Y 2115/10* (2016.08)

(58) Field of Classification Search
CPC .... A01G 27/00; A01G 27/001; A01G 27/002; A01G 27/006; A01K 27/00; A01K 27/001; A01K 27/002; A01K 27/006
USPC .......................................................... 119/859
See application file for complete search history.

(56) References Cited

U.S. PATENT DOCUMENTS

| | | | | |
|---|---|---|---|---|
| 2,721,257 A * | 10/1955 | Knox | ................... | A01K 27/006 119/859 |
| 3,944,803 A * | 3/1976 | Chao | ................... | A01K 27/006 362/108 |
| 4,173,201 A * | 11/1979 | Chao | ................... | A01K 27/006 119/859 |
| 4,523,258 A * | 6/1985 | Morse | ................. | F21V 33/0008 362/108 |
| 4,812,953 A * | 3/1989 | Ask | ........................ | G08B 5/006 362/103 |
| 5,434,759 A * | 7/1995 | Endo | ...................... | G09F 13/22 362/103 |
| 5,501,180 A | 3/1996 | Beere | | |
| 5,523,927 A * | 6/1996 | Gokey | ................. | A01K 27/006 362/103 |
| 5,630,382 A * | 5/1997 | Barbera | ............... | A01K 27/006 119/859 |
| 6,055,942 A * | 5/2000 | Romanak | ............. | A01K 27/006 119/859 |
| 6,125,793 A | 10/2000 | Petty | | |

(Continued)

*Primary Examiner* — David J Parsley
*Assistant Examiner* — Danielle A Clerkley
(74) *Attorney, Agent, or Firm* — Hanrahan Law Firm, P.A.; Benjamin M. Hanrahan (57) ABSTRACT

An illuminated dog belt specifically adapted to be secured to or worn around a back and chest, rearward of the front legs, is presented herein. The belt includes an elongated LED or light strip positioned in a manner to shine light through a translucent or at least partially transparent main body portion. A strap may be disposed through one or more strap retention openings and secured around the animal. The strap includes an amount of lengthwise or longitudinal elasticity for disposing at least a portion of the strap substantially pressed against the chest of an animal in a position rearward of the animal's front legs. In this manner, the main body portion and the LEDs or light strip may be disposed proximate to a portion of the animal's back, also in a position rearward of the animal's neck or collar.

14 Claims, 6 Drawing Sheets

(56) References Cited

U.S. PATENT DOCUMENTS

| | | | |
|---|---|---|---|
| 6,394,040 B1 | 5/2002 | Axel | |
| 6,394,041 B1 | 5/2002 | Katz | |
| 6,877,889 B2 * | 4/2005 | Peng | A01K 27/006 |
| | | | 119/859 |
| 6,970,090 B1 | 11/2005 | Sciarra | |
| 7,140,327 B2 | 11/2006 | Morehead | |
| 7,568,813 B2 * | 8/2009 | Barker | F21L 4/04 |
| | | | 362/103 |
| 7,753,008 B2 | 7/2010 | Krenkel | |
| 8,261,699 B2 | 9/2012 | Cho | |
| 8,511,856 B2 | 8/2013 | Brauser et al. | |
| 9,370,166 B1 * | 6/2016 | Ford | A01K 27/002 |
| 9,488,365 B2 * | 11/2016 | Georgi | A01K 27/006 |
| 2007/0256646 A1 * | 11/2007 | Ayscue | A01K 27/006 |
| | | | 119/859 |
| 2007/0291473 A1 * | 12/2007 | Traynor | A01K 11/00 |
| | | | 362/106 |
| 2012/0206906 A1 | 8/2012 | Gindi | |
| 2013/0014705 A1 | 1/2013 | Cho et al. | |
| 2013/0128556 A1 | 5/2013 | Brauser et al. | |
| 2015/0282455 A1 | 10/2015 | Sebo | |
| 2015/0313182 A1 * | 11/2015 | Overman | F21V 23/0407 |
| | | | 119/850 |

* cited by examiner

ILLUMINATED DOG BELT

FIELD OF THE INVENTION

The present invention is generally directed to an illuminated belt adapted to be worn by or otherwise strapped around the body of a pet or animal, such as, but not limited to a dog or cat. In particular, the belt includes an illuminated LED strip or a series of LED lights illuminating at least partially through a translucent, frosted or transparent cover or main body portion that is secured to the animal via an adjustable or other strap. The strap, in some embodiments, can include an amount of lengthwise elasticity allowing the belt or strap to be snug or tightly worn around the body of the animal, such as around the back and chest of the animal in a position that is rearward of or behind the front legs of the animal.

BACKGROUND OF THE INVENTION

Most dog, cat or animal owners know that it can be difficult to visually track a pet in a dark environment, such as during the night time, or at times when visibility is low or reduced. For example, during the evening or night hours, or during times of darkness, when a dog owner takes his or her dog for a walk or lets his or her dog roam around an open area, whether in a back yard, fenced-in area, park, dog park or other area, it is often difficult to maintain visual contact with the dog due to the low light environment or reduced visibility. There can also be an increase in danger when passing motorists are not able to see the animal at night or during times of reduced visibility. It would, therefore, be beneficial to have a device that can illuminate and that can be attached to or worn by a dog, pet or other animal in order to increase its visibility, not only to its owner, but also to other people and motorists nearby.

It should be noted that dog or pet collars, and the like, that secure around the neck portion of a dog, cat or other pet, are well known and come in a variety of sizes, generally suited to fit different sized animals. Many of these collars are intended to be worn at all times and often, but do not always, carry tags, such as name tags identifying owner information, vaccination tags, rabies tags, etc. Such collars must be worn loosely as they are secured around the neck and collar of the dog or animal. Otherwise, if the collar were tight or snug against the animal's neck, there would be a high risk of choking or injuring the animal. Because of this, these collars can often rotate, slide or otherwise move quite a bit as the animal moves about.

Thus, in the event a portion of a collar intended to be worn about the neck of an animal includes a light source, such as an LED, for example, the loosely fitting collar could rotate or otherwise move such that the positioning of the light or LED could be inadvertently located in an inconvenient or undesirable position. For instance, while a light on the top of the dog or animal may be desired, the collar could rotate or move, thereby causing the light to be inadvertently positioned at the bottom of the animal's neck, shining downward. Also, depending on the particular breed or style of grooming, many dogs and animals include a significant amount of hair and skin around the neck area. This hair and/or skin can cover a portion of the collar, for example, a portion of the collar that may include an LED or light source.

Accordingly, there is a need in the art for an illuminated pet belt that can be securely positioned, for example, in a tight, snug or pressing relation, around the back and chest of an animal, e.g., in a position rearward or behind the animal's front legs. By positioning the belt rearward of the animal's front legs, the belt can be tight or substantially pressed against the body of the animal without risking injury to the animal, such as by choking. In this regard, the proposed belt includes a strap that has an amount of lengthwise elasticity that can be stretched and secured around the body of the animal in a snug or pressed manner. This restricts rotational movement of the belt about the body as the animal moves, thereby maintaining the belt in the desired position.

SUMMARY OF THE INVENTION

Accordingly, the present invention is generally directed to an illuminated dog, canine, or pet belt adapted to be secured to or worn by a pet and which is structured to illuminate or otherwise emit an amount of light, for example, via one or more lights, bulbs and/or light emitting diodes (LEDs). As provided herein, some embodiments of the belt are specifically adapted to be worn or secured to or around the back and chest of the animal, for example, in a position rearward or behind the front legs. This allows the belt to be worn or secured to the animal in a snug or an at least partially tight manner, for example, by pressing against the body of the animal, without choking or potentially injuring the animal.

Specifically, the belt may include an adjustable strap that has an amount of lengthwise or longitudinal elasticity or stretchability such that the strap can stretch or be flexible and resilient in a lengthwise direction. In this manner, the belt, and in particular, the strap thereof, can be secured to the dog or other animal in a tight, secure or snug manner, such as by being pressed against the body or surface of the animal. This prevents or otherwise restricts rotational movement of the belt while the belt is secured to the animal, and thereby, substantially maintains the belt in the optimal or desired orientation or position, for example, so that the lights or LEDs can be pointed in a constant upward orientation, for example, at or near the animal's back.

Some embodiments include a resilient, flexible and/or pliable main body section through which the LEDs or other light source may shine. For example, the main body section can be constructed of a silicone or other material and can be configured to transmit, diffuse or propagate light at least partially there through. In particular, the light may be diffused or spread throughout the main body portion of the belt by virtue of the material chosen, which can be, but is in no way limited to a translucent or at least partially transparent silicone material.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
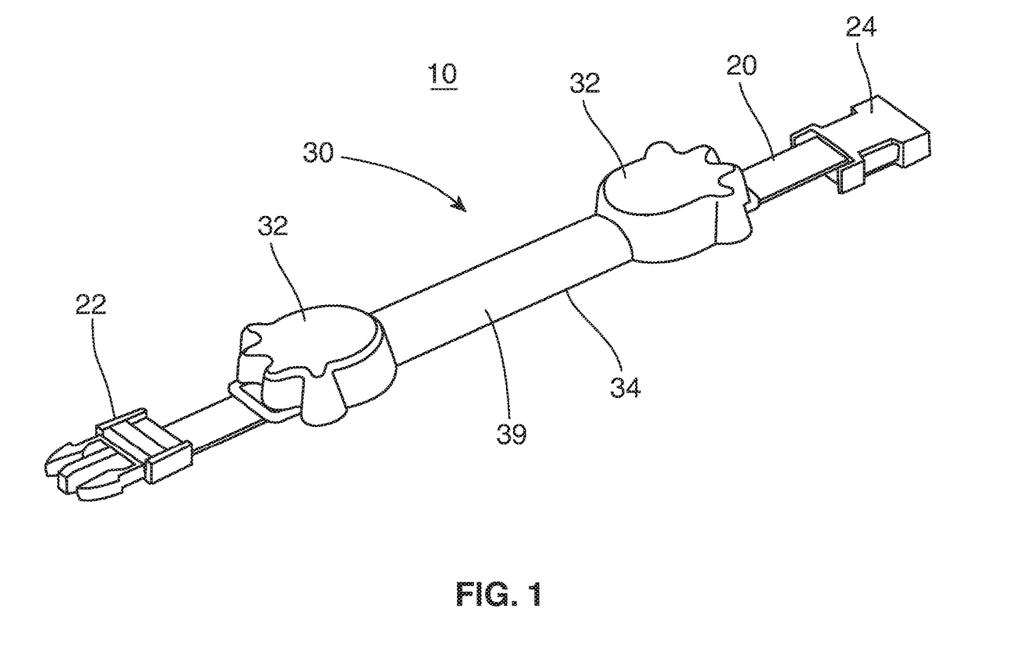
FIG. 1 is a top perspective view of the illuminated dog bet as disclosed in accordance with at least one embodiment of the present invention.
Figure 5:
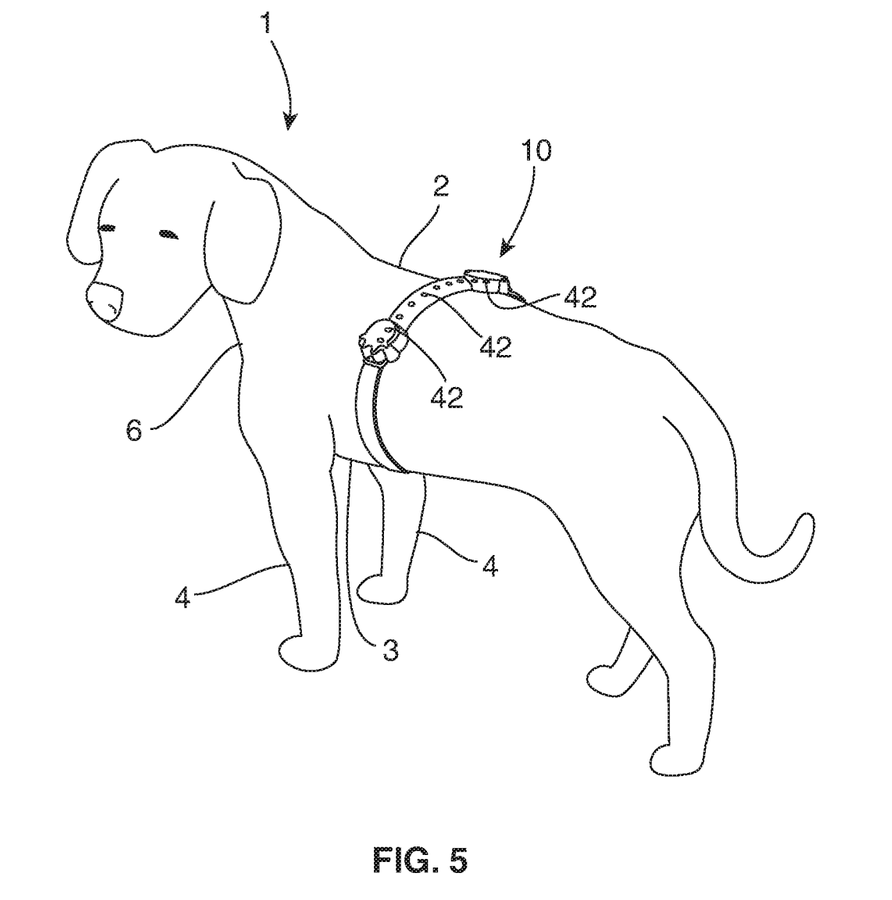
FIG. 5 is a perspective view of the illuminated dog belt worn by a dog around the chest and back rearward of the front legs.
Figure 6:
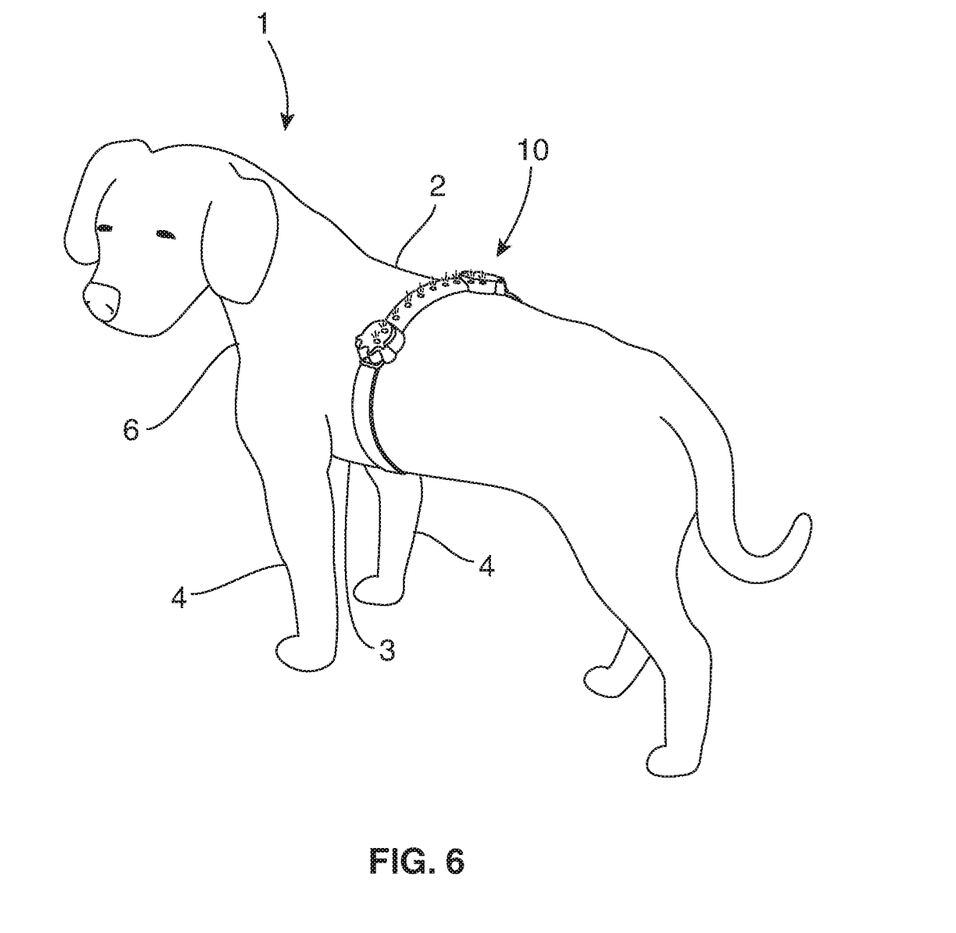
FIG. 6 is a perspective view of the belt illustrated in FIG. 5, with the light strip turned on or illuminated.

As shown in the accompanying drawings, and with particular reference to FIGS. 1, 5 and 6, for example, the present invention is directed to a belt, generally illustrated as 10, adapted to be secured to or worn by an animal 1 or pet, such as a dog, cat, etc. As described herein, the belt 10 is structured or adapted to illuminate or otherwise emit an amount of light, for example, via one or more lights, bulbs and/or light emitting diodes (LEDs), allowing the belt 10, and therefore the animal 1, to be easily located, tracked or visible in low light environments, such as the dark or during nighttime hours. In addition, it should be noted that some embodiments of the belt 10 are specifically adapted to be worn or secured to or around the back 2 and chest 3 of the animal 1, for example, in a position rearward or behind the front legs 4, as generally illustrated in FIGS. 5 and 6. This allows the belt 10 to be worn or secured to the animal in a snug or an at least partially tight manner without choking or potentially injuring the animal, as could be the case if the belt 10 or other like device were wrapped tight around or pressed against the neck 6 or collar portion of the animal 1.

For instance, the belt 10 of at least one embodiment of the present invention includes a strap 20 or other like device that is adapted or structured to wrap around or at least partially press against the body of the animal 1, for securing the belt 10 thereto. Accordingly, the strap 20 of at least one embodiment may include an at least partial lengthwise or longitudinal elasticity or stretchability, for example, as shown by reference arrow A in FIG. 4. The elasticity or stretchability of the strap 20 allows the strap 20 to at least partially stretch, flex or adjust in at least a lengthwise or longitudinal direction. In this manner, the belt 10, and in particular, the strap 20 thereof, can be disposed in a tight, secure or snug manner, such as by being pressed against the body or surface of the animal 1. This prevents or otherwise restricts rotational movement of the belt 10 while the belt 10 is secured to the animal 1, and thereby, substantially maintains the belt 10 in the orientation or position, as illustrated in FIGS. 5 and 6, so that the lights or LEDS can be positioned or pointed in a constant upward relation, for example, at or near the animals back 2. In contrast, if the belt 10 were loose or if the belt 10 did not have the elasticity to secure the belt 10 in a snug manner or pressed against the body of the animal 1, then the belt 10 may have a tendency to rotate or spin around the body of the animal 1, causing the LEDs or lights to be re-oriented potentially in a downward relation, for example, at or near the animal's chest or stomach.

Accordingly, the strap 20 may be constructed of a nylon, elastic or other like material that includes an at least partial lengthwise or longitudinal elasticity or stretchability, as described herein, although other materials are contemplated within the full spirit and scope of the various embodiments of the present invention. It should also be noted that some embodiments also include clips, buckles or attachment device(s) 22, 24 structured to removably secure or attach corresponding ends of the strap. For example, one attachment device 22 secured to one end or portion of the strap 20 may fit into or secure to another attachment device 24 secured to another end or portion of the strap 20. Of course, other attachment devices, clips, buckles, etc. well known in the art can be used to attach two free ends of the strap 20 and/or in order to adjust the length of the strap 20. For instance, in some embodiments, the length of the strap can be adjusted, for example, via the attachment device(s) 22, 24 or via a separate length adjustment buckle or device, in order for the strap 10 and therefore the belt 10 to fit around the body of different sized animals or dogs.

Furthermore, the various embodiments of the present invention also include a main body portion 30 interconnected to the strap 20, either directly or indirectly. For instance, the main body 30 of at least one embodiment includes an elongated configuration and extends at least partially along the length of the strap 20. In some embodiments, the main body 30 may also include an at least partially flexible configuration so that when the strap 20 and/or belt 10 is secured or wrapped around the body of the animal 1, the main body 30 can flex or bend, for example, in order to at least partially conform to the curvature of the animal's body. This can be seen generally in FIGS. 5 and 6 where the belt 10 is secured to the body of a dog. Accordingly, in some embodiments, the main body 30 may be constructed of a silicone material such that it is flexible and durable, although, of course, other materials are contemplated within the full spirit and scope of the present invention.

Furthermore, in some embodiments, as illustrated in FIG. 1, for example, the main body 30 may include opposite or opposing ends 32 connected by an elongated center or connecting portion 34. The ends 32 may be connected to opposite longitudinal ends of the elongated center portion 34, although other configurations are contemplated. In addition, and still referring to FIG. 1, for example, in some embodiments, the opposing longitudinal ends 32 of the main body portion 30 may be larger than or otherwise exhibit and enlarged configuration relative to the center or connecting portion 34. Specifically, the width of the ends 32 may extend past the width of the center or connecting portion 34, such that the ends 32 are wider than the center or connecting portion 34. Also, the height of the ends 32 may extend beyond the height of the center or connecting portion 34, as well.

In some embodiments, the main body 30 and/or one or more portions of the main body 30 may be configured to represent an item or object. Specifically, in the exemplary illustrated embodiment, the ends 32 are configured or constructed to represent paws, such as dog paws, cat or feline paws, etc. In other implementations, the main body 30 may be constructed or shaped to represent a bone, such as a dog bone (not shown). Of course, in other embodiments or implementations the main body may be structured or configured to represent other items or objects, or not. Accordingly, the illustrations, and in particular, the paw-shaped ends 32 should be deemed exemplary and non-limiting.

Figure 4:
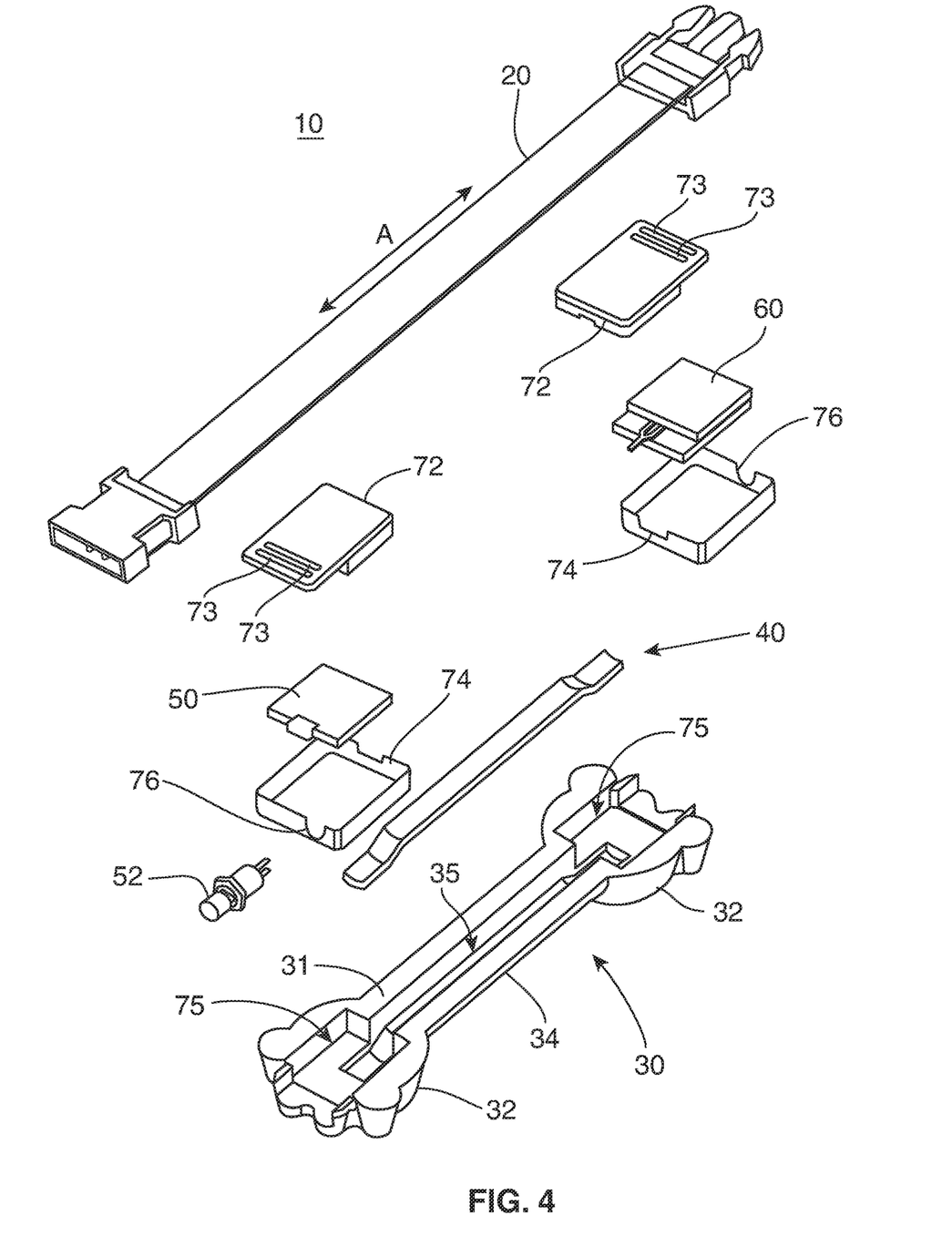
FIG. 4 is an exploded view of the illuminated dog belt as disclosed in accordance with at least one embodiment of the present invention.

With reference now to the exploded view of FIG. 4, at least one embodiment of the present invention also includes an elongated illumination strip or device, generally referenced as 40. The illumination strip 40 includes at least one, but in most cases, a plurality of lights 42 (FIG. 5) or like devices disposed along at least one side thereof. While in many implementations the one or more lights 42 include light emitting diodes (LEDs), other lights or illumination devices are contemplated, such as miniature bulbs, etc. capable of facilitating the practice of the present invention in the intended manner. As an example, the illumination strip or device 40 may include a rope light, electroluminescent tape, or a strip of LEDs with the lights and/or LEDs disposed in a spaced relation along a length thereof. It should also be noted that the LED(s) or light(s) 42 may be include a decorative shape or decorative cover (not shown), such as, for example, paw-shaped lights or coves, bone-shaped lights or covers, etc., although virtually any shape of light or light cover may be contemplated and implemented herein.

In at least one embodiments, the LED strip or illumination strip 40 may be secured to the main body 30 of the belt 10, or otherwise positioned within or on the belt 10 such that the lights or LEDs face in an upward or outward direction when the belt is worn by an animal, as generally illustrated in FIGS. 5 and 6. Particularly, the light(s) or LED(s) 42 may be positioned below and outward surface 39 of the main body 30 such that the light(s) or LED(s) 42 shine through the main body 30. Although, in other embodiments, the light(s) or LED(s) 42 may be exposed or positioned along or on top of the outward surface 30 of the main body 30.

For example, in one implementation, the LEDs and/or lights 42 are positioned in a manner such that they will emit light through the main body 30 when illuminated (FIG. 6). In this manner, the main body 30 may be constructed of an at least partially transparent, translucent or frosted material such that light can be transmitted through the main body 30. In some cases, the main body 20 may be constructed of an at least partially transparent or translucent silicone material that can spread, diffuse or project light that is transmitted there through, for example, via an illumination strip 40 or other like device. For instance, the light emitted from the illumination strip 40 may spread throughout or be diffused within the entire or a substantial portion of the main body 30.

With reference again to the exploded view of FIG. 4, in at least one embodiment, the main body 30 may include a channel 35 adapted to receive the illumination strip 40 therein. In some embodiments, such as the embodiment illustrated in FIG. 4, the channel 35 may be disposed on an inwardly facing side 31 of the main body 30; the inwardly facing side 31 being defined as the side that faces the animal 1 when the belt 10 is worn. Of course, the channel 35 may be enclosed entirely within the main body 30 or disposed on the outwardly facing side 39 of the main body 30.

Furthermore, the channel 35 of at least one embodiment spans substantially or entirely across the center or connecting portion 34 of the main body 30 such that the light or LEDs 42 will be positioned substantially or entirely across the length of the main body 30 or substantially or entirely across the length of the center or connecting portion 34 thereof. In the illustrated embodiment, the channel 35, and therefore, the illumination strip 40 or LED strip may at least partially enter into one or both of the opposing ends 32. In this manner, the lights and/or LEDs 42 may also span into the ends 32, as shown in FIGS. 5 and 6.

Still referring to FIG. 4, at least one embodiment of the present invention also includes one or more control units 50 and another or more batteries 60. Specifically, the control unit 50 may include a microcontroller, microprocessor, memory, printed circuit board (PCB), or other processors, controllers, or units capable of facilitating the practice of the present invention in the intended manner. As just an example, the control unit 50 or control board may include an ARDUINO board, an ARDUINO LEONARDO microcontroller, a BEETLE ARDUINO board, etc., although these are certainly only non-limiting examples of various microcontrollers, control units or PCB that can be used or implemented within the various embodiments of the present invention. In any event, the control unit or board 50 comprises control circuitry, programming and certain hardware such as one or more processors and/or memory structured to implement one or more features of the present invention, such as by controlling the illumination strip 40 or LED(s) 42. For example, the control unit 50 may include or may be connected to a switch 52, such as an on/off switch that is used to control power or voltage provided to the illumination strip 40, for example, via a battery 60. For instance, the control unit 50 and/or illumination strip 40 may be connected to the battery 60 for controlling power or voltage to the illumination strip 40 in order to turn the illumination strip on (FIG. 6) and off (FIG. 5). The switch 52 may be used to manually control the on/off functionality of the illumination strip 40 or LEDs 42.

It should be noted that in other embodiments or implementations the belt 10, and in particular the control unit 50, may wirelessly connect to a separate remote (not shown) or a personal electronic device, such as a mobile phone or smartphone, tablet, computer, etc. (not shown). This can allow a user to remotely control the belt 10, for example, by turning the LED strip or other illumination strip 40 on/off remotely via a remote control or separate electronic device. In this manner, the present invention may also include a mobile application that can be downloaded, installed or accessed by a smartphone, tablet or other electronic device in order to facilitate user control of the belt 10 remotely. The belt 10 may connect to the remote or personal electronic device via Bluetooth, Wifi, Zigbee, infrared, other wireless connection protocol.

Moreover, and still referring to FIG. 4, at least one embodiment includes at least one housing structured to retain, house or otherwise at least partially protect the control unit 50 and/or the battery 60. For example, the housing may be defined by a cover 72 and/or a base 74, between which the control unit 50 and/or the battery 60 may reside. In at least one embodiment, the housing(s) is constructed of an at least partially rigid material, such as a plastic or metal, and which can at least partially protect the contents therein (e.g., the control unit 50 or battery 60) from the outer elements and/or from impact damage that may be subjected to the belt 10 during normal use. It should also be noted that while the exemplary embodiment illustrates a two-piece housing (e.g., base 74 and cover 72), other embodiments may include a single piece construction or multiple piece construction. Other embodiments may only include a cover 72, for example.

In any event, the housing 72, 74 may be positioned within a recess 75 (e.g., first and second recesses 75) disposed within the main body 30, for example, at or near one or both of the ends 32. Particularly, as illustrated in FIG. 4, at least one embodiment includes two housings, one structured to retain the control unit 50 and another, separate housing to retain the battery 60, wherein each of the separate housings are disposed or positioned at least partially within a different one of the opposing ends 32. Of course, other embodiments may include one housing capable of or adapted to retain both the control unit 50 and the battery or batteries 60.

Furthermore, the housing(s) 72, 74 may include an opening or port, generally referenced as 76, through which external access to either the control unit 50, the battery 60 or both may be provided. Specifically, as shown at 52, the switch may be electrically or otherwise connected to the control unit 50 through a corresponding opening or port 76 in order to provide external manual access to the switch 52.

Also, the battery 60 of at least one embodiment may be rechargeable in that a cable may be connected to the belt 10 in order charge or recharge the battery 60. In this manner, a port or opening 76 may be provided in the housing 72, 74 where a cable can be connected or where a port can be provided for connection with a cable. The port may include a mini- or micro-USB port, although other connections and/or ports are contemplated. Wireless charging, for example, through wireless indicative charging may also be implemented.

Figure 2:
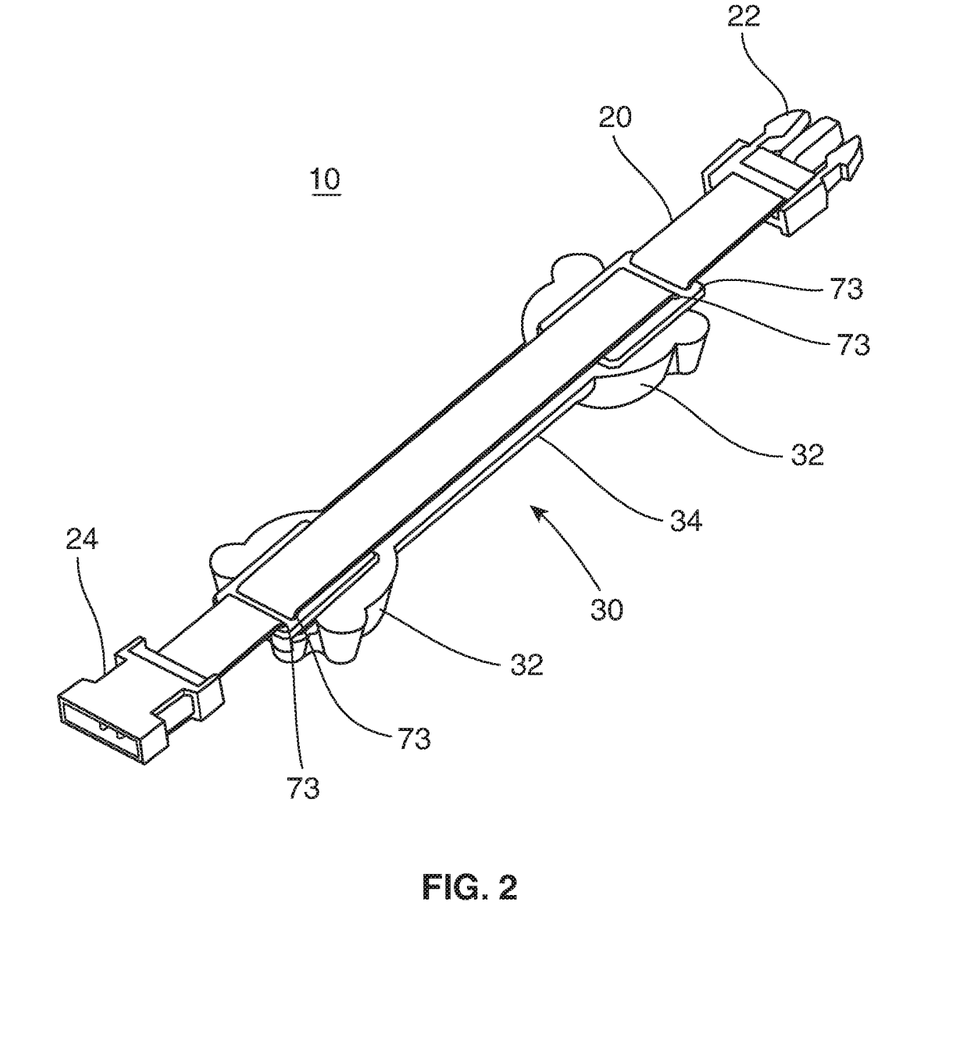
FIG. 2 is a bottom perspective view of the illuminated dog belt as disclosed in accordance with at least one embodiment of the present invention.
Figure 3:
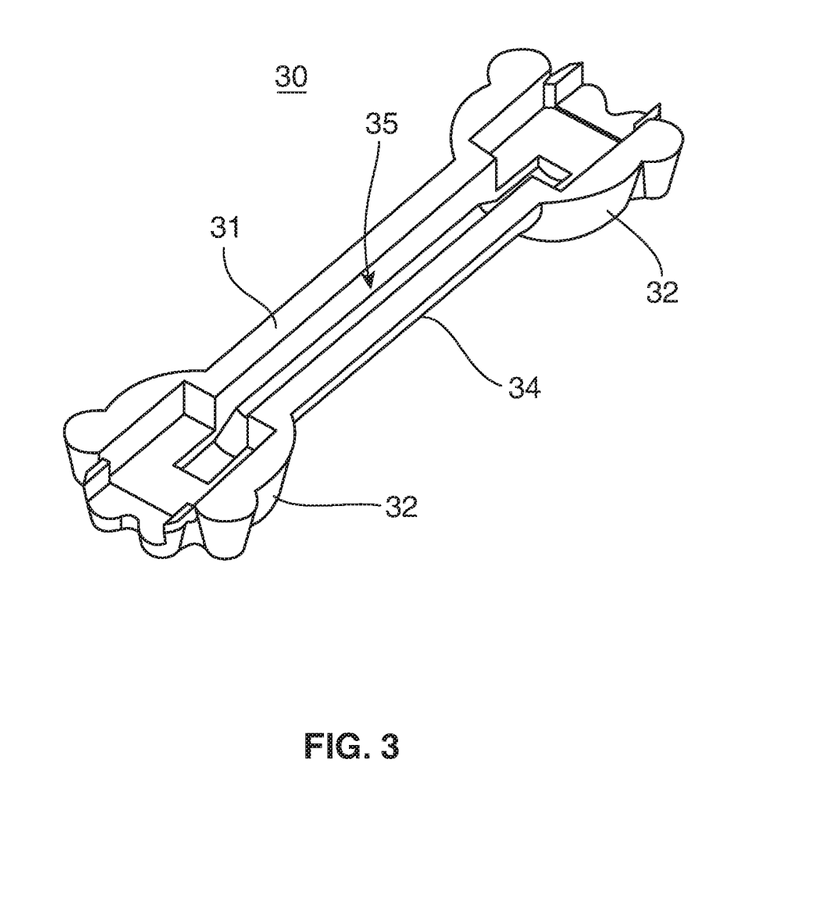
FIG. 3 is a bottom perspective view of the main body portion of the illuminated dog belt as disclosed in accordance with at least one embodiment of the present invention.

Moreover, the housing, and in particular the cover 72 thereof, of at least one embodiment may be disposed on or near the inwardly facing surface 39 of the main body 30 and/or include a one or more strap retention openings 73 through which the strap 20 may be disposed or engaged. For example, as illustrated in FIG. 2, the strap 20 may be threaded or disposed through the strap retention opening(s) 73 for retaining the strap to the housing(s) or cover(s) 72, thereby retaining the strap to the belt 10 or main body 30.

Other features or structures of certain embodiments of the present invention may include one or more speakers (not shown) or audio controls, such as play, pause, stop, next, etc. (not shown) embedded or connected to the belt 10 or main body 30 thereof. The speaker(s) may be used to emit sound, music or other audio during use of the belt 10, for example, while the dog is being walked or on a leash. The music or other audio may be wirelessly transmitted from a mobile phone, smartphone, tablet or other electronic device, for example, via Bluetooth, Wifi, Zigbee, etc. In this manner, in addition to transmitting prerecorded, stored or streamed music or audio to the belt 10, it is also contemplated that live or near-live audio may be transmitted from a remote or wirelessly connected device to the belt 10 or speaker(s) thereof. Specifically, a user may be able to speak into a remote or smartphone, for example, via a mobile application, which can then be transmitted to the belt 10 or speaker(s) thereof. This can allow a user to remotely speak to the dog or other animal, if desired, through the belt 10 and a connected device.

Other features may also include a GPS or other locating device incorporated in the belt 10, such that the belt 10 can be located or tracked remotely, for example, via a smartphone, tablet, computer, etc. This feature can be useful in the event the dog or animal escapes or becomes lost. The location of the belt 10 can then be remotely retrieved via a computer or smartphone, for example, for easily locating the lost or escaped animal.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. An illuminating pet belt, comprising:
   a main body,
   said main body comprises an elongated center portion terminating at opposing longitudinal ends, said main body further comprising an at least partially flexible configuration,
   said opposing longitudinal ends comprising an enlarged configuration wherein said elongated center portion comprises a width narrower than a width of each of said opposing longitudinal ends,
   each of said opposing longitudinal ends comprising a recess with a housing disposed in each of said recesses of said opposing longitudinal ends,
   an elongated channel disposed longitudinally through said elongated center portion of said main body and extending in an at least partially overlapping relation relative to said recess in each of said opposing longitudinal ends,
   an elongated illumination strip comprising a plurality of lights disposed at least partially along a length thereof, said elongated illumination strip being disposed within said elongated channel, wherein said plurality of lights of said elongated illumination strip are positioned to emit light through the entire elongated center portion of said main body, wherein said light emitted by said plurality of lights is diffused through the entire length of said elongated center portion of said main body, and
   a strap connected to said main body and adapted to secure around a body portion of an animal, said strap comprising an amount of lengthwise elasticity for securing said strap to the body of the animal in a snug manner.

2. The illuminating pet belt as recited in claim 1 wherein said strap is adapted to secure around a back and a chest portion of the animal at a position rearward of the front legs.

3. The illuminating pet belt as recited in claim 2 wherein said strap is adapted to be substantially pressed against the surface of the animal's chest via said amount of lengthwise elasticity.

4. The illuminating pet belt as recited in claim 1 wherein said channel is disposed on an inwardly facing surface of said main body.

5. The illuminating pet belt as recited in claim 1 further comprising at least one battery, and at least one microcontroller board, said at least one battery being disposed in said housing disposed in one of said recesses, and said at least one microcontroller board being disposed within said housing disposed in another one of said recesses.

6. The illuminating pet belt as recited in claim 5 wherein said opposing longitudinal ends are each structured to resemble a paw.

7. The illuminating pet belt as recited in claim 1 wherein said housings each comprise at least one strap opening through which said strap is disposed.

8. The illuminating pet belt as recited in claim 1 wherein said elongated illumination strip comprises an LED strip.

9. The illuminating pet belt as recited in claim 8 wherein said main body comprises an at least partially translucent silicone material through which said LED strip illuminates.

10. An illuminating pet belt, comprising:
   a main body comprising an at least partially elongated and an at least partially flexible configuration, said main body comprising two longitudinally opposed ends and an elongated center portion connecting said two longitudinally opposed ends, wherein said two longitudinally opposed ends comprise enlarged configurations relative to said elongated center portion,
   an elongated LED strip comprising a plurality of spaced apart LEDs, said elongated LED strip being disposed entirely along said elongated center portion of said main body, wherein said elongated LED strip spans at least partially into and between each of said two longitudinally opposed ends, wherein said plurality of LEDs are oriented to emit light through at least a portion of said main body, wherein said light is spread through center portion and said two longitudinally opposed ends of said main body, a first recess disposed in a first one of said two longitudinally opposed ends, and a second recess disposed in a second one of said two longitudinally opposed ends, a first housing disposed in said first recess and a second housing disposed in said second recess, said elongated LED strip being disposed in a partially overlapping relation with said first recess and said second recess, a strap connected to said main body and by being at least partially disposed through at least one strap retention opening, said strap comprising an amount of lengthwise elasticity for disposing at least a portion of said strap substantially pressed against a chest of an animal in a position rearward of the animal's front legs, and wherein said main body is disposed proximate to a portion of the animal's back in a position rearward of the animal's neck.

11. The illuminating pet belt as recited in claim 10 wherein said first housing and said second housing each comprise a strap retention opening.

12. The illuminating pet belt as recited in claim 10 wherein said main body comprises a channel within which said elongated illumination strip is disposed, and wherein said plurality of lights are directed at least partially through said main body, said channel being disposed in an at least partially overlapping relation relative to said first recess and said second recess.

13. The illuminating pet belt as recited in claim 12 further comprising at least one battery disposed in said first housing and at least one control unit disposed in said second housing.

14. An illuminating pet belt, comprising:

a main body, said main body comprises a single-piece construction defining an elongated center portion terminating at opposing longitudinal ends, said opposing longitudinal ends each comprising an enlarged configuration, wherein said elongated center portion comprises a width narrower than a width of each of said opposing longitudinal ends, an elongated LED strip comprising a plurality of LEDs disposed at least partially along a length thereof, said main body comprising a thickness structured to receive and surround said plurality of LEDs of said elongated LED strip, wherein said plurality of LEDs of said elongated LED strip are positioned to emit light through the entire elongated center portion of said main body, wherein said light emitted by said plurality of LEDs is diffused through the entire length of said elongated center portion of said main body, and a strap connected to said main body and adapted to secure around a body portion of an animal, said strap comprising an amount of lengthwise elasticity for securing said strap to the body of the animal in a snug manner.

* * * * *